United States Patent [19]

Baar et al.

[11] 4,013,829

[45] Mar. 22, 1977

[54] METHOD FOR THE PRODUCTION OF PRINTING FORMS

[75] Inventors: Walter Baar; Jürgen Dölves, both of Kiel, Germany

[73] Assignee: Dr. -Ing. Rudolf Hell GmbH, Kiel, Germany

[22] Filed: Feb. 27, 1976

[21] Appl. No.: 661,984

[30] Foreign Application Priority Data

Feb. 28, 1975 Germany .......................... 2508734

[52] U.S. Cl. ................................ 358/299; 358/302
[51] Int. Cl.$^2$ .......................................... H04N 1/06
[58] Field of Search ................. 178/5, 6.6 B, 6.6 R, 178/6.7 R

[56] References Cited

UNITED STATES PATENTS

| | | | |
|---|---|---|---|
| 3,272,918 | 9/1966 | Koll | 178/6.6 A |
| 3,582,549 | 6/1971 | Hell | 178/6.6 B |
| 3,636,251 | 1/1972 | Daly | 178/6.6 B |
| 3,956,583 | 5/1976 | Pugsley | 178/6.6 B |
| 3,975,761 | 8/1976 | Taudt | 358/78 |

*Primary Examiner*—Howard W. Britton
*Assistant Examiner*—Edward L. Coles
*Attorney, Agent, or Firm*—Ernest F. Marmorek

[57] ABSTRACT

A method for the production of a printing form by the scanning point-by-point and line-by-line of an image pattern along successive cylindrical peripheral image lines and engraving cavities along corresponding cylindrical peripheral engraving lines, features the steps of generating scanning image signals from the image pattern from along one of the cylindrical peripheral image lines, reading the image signals into a storage device, reading the stored image signals out of the storage device and coupling the read-out image signals to an engraving device. Then, the engraving with the engraving device is carried out along a cylindrical peripheral engraving line corresponding to the one image line in response to the read-out image signals. The engraving device is moved to a succeeding cylindrical peripheral engraving line, the read-out of said image signals and the engraving of cavities are inhibited at least during the time said engraving device is being moved to the succeeding engraving line, continuing the read-out and engraving of said succeeding engraving line at the stored image signals or cavities marking the end of the moving of said engraving device and in that, when the end of the engraving line is reached, the first portion of it, which was previously omitted, is engraved retrospectively and the next movement of the engraving device to the succeeding engraving line takes place.

19 Claims, 7 Drawing Figures

METHOD FOR THE PRODUCTION OF PRINTING FORMS

BACKGROUND OF THE INVENTION

The invention relates to a method for the production of a printing form by the scanning point-by-point and line-by-line of an image pattern along successive cylindrical peripheral image lines and engraving cavities along corresponding cylindrical peripheral engraving lines.

Generally, an image pattern which is to be reproduced is mounted on a scanning or image cylinder which is rotated during the process. The image pattern is scanned helically by a scanning device such as an optical scanner which is continuously guided parallel to the axis of the image cylinder. The image pattern can contain half-tone images and/or characters. The tone value of the scanned image points determine the amount of the reflected light and the reflected light is detected and converted into image signals. In order to produce a photogravure screen on the engraving cylinder, a screen signal is superimposed over the image signals.

The engraving device includes an engraving member such as a mechanical engraver which uses an engraving needle as a cutting tool. The engraving member moves continuously along the rotating engraving cylinder.

The screen signal creates a vibrating lifting movement of the engraving needle and the image signals determine the penetration depth of the engraving needle into the surface of the engraving cylinder. Thus, a series of cavities of varying depth are produced along a helical line at the surface of the engraving cylinder.

In one prior art system, the image and engraving cylinders are each driven by a separate synchrouous motor. Another known system uses a single synchronous motor to rotate the image and engraving cylinders which are rigidly connected axially to each other.

The engraving cylinder is used in a photogravure rotary machine for a printing process. The cylinder is inked and the cavities retain an amount of ink depending upon the respective cavity depth. During the printing process, ink is transferred from the cavities to a printing carrier and the tone-value of the printed surface is determined by the depth of the respective cavities which are disposed in a screen defined on the cylinder surface. For multi-color printing, cavities for each color are engraved on a single cylinder. In the photogravure rotary machine, a color print is produced by superimposing the printing from different engraving cylinders for the respective colors. In carrying out the process, inaccuracies arising due to alignment errors can occur and these errors have a disturbing influence on a person viewing the finished color print.

Alignment errors can arise during the engraving of the engraving cylinder because of different positions of the gravure on the engraving cylinder for a set of colors. Errors can also arise during the printing process itself if the synchronism between the engraving cylinder and the printing carrier is not precise. The accuracy of the synchronism in the photogravure rotary machine can be corrected through known control devices but no possibility exist to correct errors which originate due to the inaccurate positioning of the gravure on the engraving cylinders. If a high quality of reproduction is required, the gravure must have an accuracy of about 1/100 mm.

In order to avoid paper loss during the printing process, it is the usual practice to have the gravure continuous or almost continuous over the surface of the engraving cylinder. In the case of the reproduction scale of 1:1, it is customary to select an engraving cylinder having a periphery equal to the length of the image pattern to be reproduced. To carry this out, it is necessary to have engraving cylinders having different diameters depending upon the size of the image pattern. According to prior art methods, the scanning and engraving take place synchronously so that the image pattern must also encompass the image cylinder in order to avoid scanning gaps. This is achieved by having image and engraving cylinders with equal diameters.

In the case of printing magazines, only a relatively few engraving cylinders are needed. In a business concerned with printing packages and decorative labels and the like, it becomes necessary to have engraving cylinders of different diameters. Likewise, such businesses require a large stock of image cylinders having different diameters in correspondence to the engraving cylinders. Furthermore, for certain processes such as a repeating process in a peripheral direction, the image cylinder somewhat smaller than the engraving cylinder must be available.

The changes in the various image cylinders result in an increased cost during the production of printing forms. In addition, the maintenance of a stock of image cylinders of different sizes and the cost in time to transport and install different image cylinders add considerably to the so-called "set-up" time for the engraving.

For the aforementioned prior art method, the scanning and engraving members move continuously along the respective image and engraving cylinders and the scanning and engraving occur along helically lines around the respective cylinders. This process has the advantage of a very simple control over the rotation of the cylinders and the advancement of the scanning and engraving members operates relatively faultlessly as long as special engravings need not be carried out.

One type of special engraving is the repeating of characters in the peripheral and axial directions of the engraving cylinder. In the course of the repeating process, an image pattern is frequently identically recorded along the circumference of the engraving cylinder. In one known repeating process, if a character is to be repeated N times, then the circumferential length of the image pattern and the image cylinder must be the Nth portion of the circumference of the engraving cylinder and the image cylinder must be driven with N-fold speed of rotation of the engraving cylinder. The possible number of characters is limited by this process due to the high speeds of rotation and the small diameter for the image cylinders. Thus, this process has only limited use and is costly to carry out.

In another known repeating process, the image and engraving cylinders have the same diameters. The image pattern is scanned and the data there obtained is stored in a digital format. The gravure of several characters takes place thereby through repeated reading of the data from the storage along a helical line of the engraving cylinder. In this process, a system error arises which, in the case of individual characters along the circumference of the engraving cylinder, becomes apparent in an axial displacement of the information content of the scanned image pattern with respect to the engraved cavities defining the screen.

In this process, additional system errors are avoided by having the total number of cavities recorded during one rotation of the engraving cylinder integrally divisible by the number of characters along the circumference of the engraving cylinder.

In the case of helical recording, this requirement cannot be satisfied because of the photogravure screen in which the cavities of one cylindrical peripheral engraving line are positioned with respect to the adjacent engraving line so as to fill gaps. The number of engraved cavities per rotation of the engraving cylinder is selected so that during the helical engraving there is a remainder of ½ of a cavity for each rotation of the engraving cylinder.

In view of these system errors, it appears that a multi-color printing can only be executed faultlessly if the characters are engraved in a superimposed manner on the engraving cylinder for a set of color plates. In actual practice, this condition can be fulfilled only with a considerable expenditure.

In the case of the repeating process in an axial direction, several characters are engraved one next to the other in the axial direction through a multi-fold scanning of the image pattern.

Between successive scannings along successive cylindrical peripheral image lines, the scanning member must be moved in an axial direction with respect to the scanning cylinder until it has traveled from one end of the image pattern to the other end. The engraving process is interrupted during the time the scanning member is being advanced.

The turning points for the advancement of the scanning member must be accurately synchronized with the lateral boundaries of the image pattern. This synchronization can be adjusted accurately only for one point of the lateral boundary of the image pattern because after one rotation of the image cylinder the scanning member has become displaced in the axial direction by the amount of the pitch of the helical line. From this, an uncertainty of the adjustment results and this can lead to an alignment error.

From the aforementioned examples, it is apparent that for certain special engraving cases, the principle of the scanning and engraving along helical lines leads to errors which can considerably reduce the quality of the reproduction.

The instant invention endeavors to overcome these disadvantages by an improved engraving process.

SUMMARY OF THE INVENTION

One of the principal objects of the invention is a method for the production of a printing form by the scanning point-by-point and line-by-line of an image pattern along successive cylindrical peripheral image lines and engraving cavities along corresponding cylindrical peripheral engraving lines, including generating scanning image signals from said image pattern from along one of said cylindrical peripheral image lines, reading the image signals into a storage device, reading the stored image signals out of the storage device and coupling the read-out image signals to an engraving device, engraving with said engraving device along a cylindrical peripheral engraving line corresponding to said one image line in response to said read-out image signals, moving said engraving device to a succeeding cylindrical peripheral engraving line, inhibiting the engraving and the read-out of said image signals at least during the time said engraving device is being moved to the succeeding engraving line, continuing the read-out and engraving of said succeeding engraving line at the stored image signals or cavities marking the end of the moving of said engraving device and in that, when the end of the engraving line is reached, the first portion of it, which was previously omitted, is engraved retrospectively and the next movement of the engraving device to the succeeding engraving line takes place.

Another object of the invention is an apparatus for carrying out the method.

In accordance with the instant invention, the gravure is continued directly after the conclusion of the movement or advancement of the engraving device in contrast to the prior art processes wherein the engraving cylinder must complete its rotation before the engraving is continued. This results in a considerable savings in time.

Another object of the invention for obtaining a complete peripheral engraving of an engraving cylinder comprises apportioning an integral number of cycles of a recording timing signal corresponding to a predetermined screen size in order to subdivide the image pattern into an equally large number of cycles for a scanning timing signal such as a matter of cycles divided by the number of repeats to be engraved and in the case where a complete peripheral engraving is not desired, dividing the image pattern into a number of cycles of the scanning timing signal, in correspondence to the same proportion as the engraving coverage is smaller than the circumference of the engraving cylinder.

Further objects and advantages of the invention will be set forth in part in the following specification and in part will be obvious therefrom without being specifically referred to, the same being realized and attained as pointed out in the claims hereof.

The method invention accordingly comprises the several staps and the relation of one or more of such steps with respect to each of the others, all as exemplified in the following detailed disclosure, and the scope of the application of which will be indicated in the claims.

The apparatus invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

In carrying into effect, one of the embodiments has been selected for illustration in the accompanying drawings and for description in the specification, reference being had to FIGS. 1-6.

Figure 1:
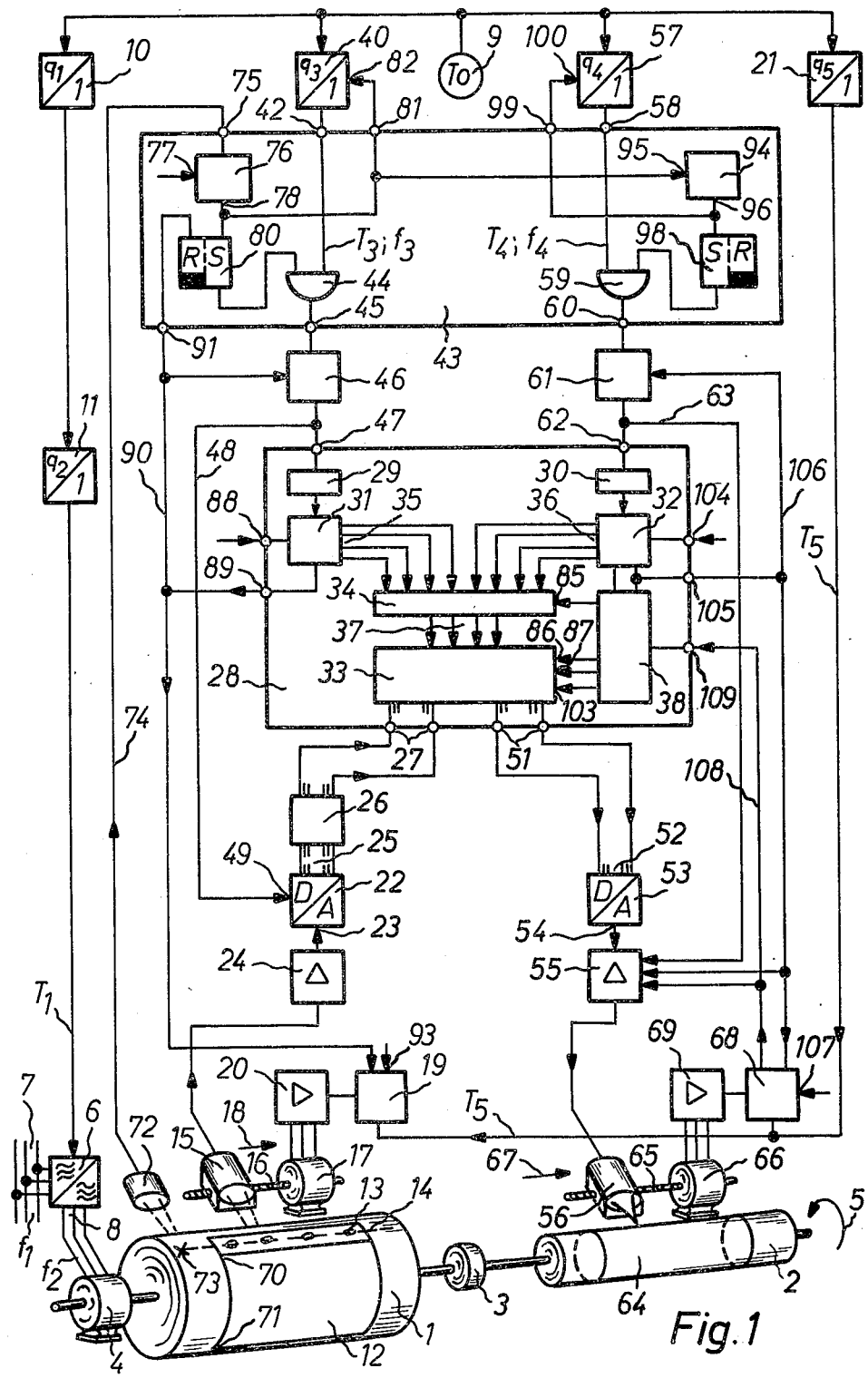
FIG. 1 is a block diagram for the instant invention.

FIG. 1 is a block diagram for an embodiment of the instant invention. An image cylinder 1 and an engraving cylinder 2 are directly coupled to each other through a coupling 3. The image cylinder 1 has a uniform circumference and can be an integral component of the engraving set-up, whereas engraving cylinders of different diameters can be used in the system. Generally, the diameter of the largest engraving cylinder to be used is preferably slightly smaller than the diameter of the scanning cylinder 1.

In a preferred embodiment, the circumference of the engraving cylinder 2 is about ⅓ of the circumference of the image cylinder 1.

In carrying out the process, the entire surface of the engraving cylinder 2 is engraved. Under this assumption, the image pattern 12 at a reproduction scale 1:1 and for the preferred diameter ratio, covers only a third of the circumference of the image cylinder 1.

Of course, the engraving can be carried out with another scale and with incomplete engraving coverage.

The image cylinder 1 and the engraving cylinder 2 are driven by a synchronous motor 4 in the direction of arrow 5. The synchronous motor 4 is energized from a power supply having a frequency $f_1$ through a converter 6. The converter 6 generates from the power supply lines 8 which carry a signal having a frequency of $f_2$ which depends upon the frequency of a timing signal $T_1$ which is connected to the converter 6. The rate of rotation of the synchronous motor 4 is proportional to the frequency $f_2$ and is also proportional to the frequency of the timing signal $T_1$.

The timing signal $T_1$ is obtained from the frequency division of a timing signal $T_0$ which is generated by generator 9. The frequency division is carried by a first dividing stage 10 having a dividing factor of $q_1$ which is adjustable and another dividing stage 11 having a constant dividing factor $q_2$.

The adjustment of the dividing factor $q_1$ of the dividing stage 10 changes the frequency of the timing signal $T_1$ and, in turn, the rate of revolution of the synchronous motor 4. This provides a control for the rate of revolution of the image cylinder 1 and engraving cylinder 2.

The image pattern 12 is connected to the surface of the image cylinder 1 by use of a row of alignment pins 13 which are disposed along a surface line 14 and are accurately positioned.

The image pattern 12 is optically scanned image line by image line by means of a scanning member 15 to generate an image signal. The scanning member 15 can be moved parallel to the axis of the image cylinder 1 in the direction of the arrow 18 by the use of a spindle 16 and a stepping motor 17.

The stepping motor 17 receives a timing signal $T_5$ through a motor control stage 19 and a power amplifier 20. The timing signal $T_5$ is generated through the division of the timing signal $T_0$ in a dividing stage 21 having a dividing factor $q_5$.

The gravure and the image pattern 12 cover different portions of the circumferences of the respective image cylinder 1 and engraving cylinder 2 so it is necessary to store the image signal before it energizes engraving member 56. This is carried out by the use of an intermediary storage device.

For the system shown in FIG. 1, the image signals are in analog form and must be converted to digital signals. The scanning member 15 is coupled to an amplifier 24 which is connected by line 23 to an analog to digital converter 22. The digital signal from converter 22 is connected by lines 25 to a gradation stage 26 which assigns tone values. The gradation stage 26 is coupled to the input terminals 27 of storage device 28.

The storage device 28 includes a delay stage 29, another delay stage 30, a recording-address counter 31, a reading-address counter 32, a storage unit 33, a multiplexer 34 for selectively connecting the lines 35 of the recording-address counter 31 or the output lines 36 of the reading-address counter 32 through the address input lines 37 of the storage unit 33 and a storage control unit 38 for the control of the read-in and read-out processes.

A scanning timing signal $T_3$ having a frequency of $f_3$ is used to control the converter 22 and the recording-address counter 31. The timing signal $T_3$ is obtained by the frequency division of the timing signal $T_0$ in a dividing stage 40 having a dividing factor of $q_3$ which is adjustable. The timing signal $T_3$ is coupled to AND gate 44 through the line 42 of a synchronization stage 43 and through the output terminal 45 of the AND gate 44 it is connected to a phase inverter 46. The output terminal 45 is common to the synchronization stage 43.

The phase inverter 46 supplies the timing signal $T_3$ to the input terminal 47 of the storage device 28 in order to control the selection of the recording addresses and through line 48 to the input terminal 49 of the converter 22 in order to control the analog to digital conversion.

A data output terminal 51 of the storage device 28 is connected to the digital input terminal 52 of a digital to analog converter 53. This forms a part of the read-out circuit for the image signals being stored. The analog output terminal 54 of the converter 53 is connected to the engraving member 56 through an engraving amplifier 55. Although the engraving member is shown here as a mechanical device, an engraving member in the form of an electron beam or laser beam could be controlled by the image signals. In the case of one of these beams, cavities would be formed by the radiation of the surface of the engraving cylinder.

Furthermore, a timing signal $T_4$ having a frequency of $f_4$ is used to control the read-out of the image signals from the storage device 28 and for the resolution of the image pattern 12 during the engraving. The timing signal $T_4$ is generated by dividing the timing signal $T_0$ in a dividing stage 57 having a constant divided factor of $q_4$. The timing signal $T_4$ is connected to the input terminal of the synchronization stage 43 and is connected from there to the AND gate 59 to the output terminal 60 which is connected to the inverter 61. The timing signal $T_4$ passes through the phase converter 61 and is connected to the input terminal 62 of the storage unit 28 for the purpose of selecting the read-out addresses in order to resolve the image pattern 12 and is also connected by line 63 to the amplifier 55.

The amplifier 55 converts the timing signal $T_4$ into a sinusoidal signal which is superimposed onto the image signals. The engraving member 56 uses an engraving needle as a cutting tool to execute the gravure on the engraving cylinder 2. The engraving member 56 moves parallel to the axis of the engraving cylinder 2 in the direction of the arrow 67 by the action of the foward thrusting device comprising a spindle 65 and a stepping motor 66. The stepping motor 66 is controlled by the timing signal $T_5$ which is connected to a motor control stage 68 and a power amplifier 69.

The scanning member 15 is not moved during the scanning of a cylindrical peripheral image line and likewise, the engraving member 56 remains at rest during the recording of the image signals for an image line. The cylindrical peripheral image and engraving lines are concentric in the preferred embodiment.

The distance "$d$" between two cavities on an engraving line is determined by the screen width to be engraved. In the case of complete coverage, a number "$Z_n$" of cavities for an engraving line can be computed from the circumference "$U_d$" of the engraving cylinder 2 and the distance "$d$". Generally, "$Z_n$" can be an integral number or a fraction. If a gapless screen is desired, then an integral number "$Z_n$" of cavities must be engraved on an engraving line.

To achieve this, the frequency $f_4$ of the timing signal $T_4$ or the rate of revolution of the engraving cylinder 2 is changed slightly in order to make the number "$Z_n$" become an integral number.

This is achieved by adjusting the dividing factor $q_1$ of the dividing stage 10.

The width of the screen to be engraved also determines forward thrusting width for the scanning member 15 and the engraving member 56 in correspondence to the step of the stepping motors 17 and 66. The depth of the cavity to be engraved is determined by the tone-value of the image points on the image pattern 12. The number "$Z_n$" of the image points scanned from the beginning to the end of an image line is equal to the number "$Z_n$" of the cavities engraved on an engraving line and the distance between two image points corresponds to the distance between corresponding cavities. These conditions are attained through the adjustment of the frequency $f_3$ of the timing signal $T_3$ so that the ratio of the frequencies for the timing signals $T_3$ and $T_4$ is substantially the same as the ratio of the diameters of the image cylinder 1 and the engraving cylinder 2.

For example, the frequency $f_3$ is substantially three times as great as the constant frequency $f_4$.

The frequency $f_3$ is adjusted to the appropriate selection of the dividing factor $q_3$ of the dividing stage 40.

During the process, the first image point of an image line is scanned at the upper margin 70 of the image pattern 12 and the last image point is at the lower margin 71. The rate of revolution "n" of the image cylinder 1 and the frequency $f_3$ are selected so that exactly "$Z_A$" image points are scanned on an image line from the upper margin 70 to the lower margin 71.

For each cycle of the timing signal $T_3$, the particular image point on the optical axis of the scanning member 15 is scanned. For this reason, the rotation of the image cylinder 1 and the timing signal $T_3$ have to be synchronized so that the first cycle of the timing signal $T_3$ occurs when the first image point is on the optical axis.

To achieve this, the synchronization stage 43 and a sensor 72 are provided. The sensor 72 optically scan for the reference mark 73 and generates a reference pulse signal once for each revolution. The reference mark 73 is disposed on the surface line defined by the alignment pins 13.

The optical axes of the sensor 72 and the scanning member 15 are substantially on the same surface line or element and the reference pulse signal is generated when the alignment pins 13 are below the scanning member 15. The sensor 72 is connected by line 72 to the input terminal of the synchronization stage 43 and a delay stage 76. The delay stage 76 can be a monostable one-shot stage. The time delay is adjusted by an input to the control terminal 77.

The time delay is adjusted so that the delay pulse signal appears at the output terminal 78 of the delay stage 76 at the substantially exact time the first image point is along the optical axis of the scanning member 15.

The output terminal 78 of the delay stage 76 is connected to the input terminal of a flip-flop 80 and from the output terminal 81 of the synchronization stage 43, it is connected to the resetting input terminal 82 of the dividing stage 40. The "Q" output of the flip-flop 80 is connected to the input terminal of the AND gate 44.

The delayed reference pulse signal appearing at the output terminal 78 of the delay stage 76 is the command to initiate the scanning operation. This command signal sets the flip-flop 80. The "Q" output of the flip-flop 80 lies at that time in the high region and places the AND gate 44 in readiness. At the same time, the command resets the dividing stage 40 so that the timing signal $T_3$ has the same phase relationship with respect to the input signal at terminal 42 of the synchronization stage 43. Thus, the command to start scanning and the timing signal $T_3$ are synchronized.

From the command to start scanning, the first cycle of the timing signal $T_3$ arrives at the converter 22 through the line 48 and initiates the analog to digital conversion of the image signal produced by the first image point.

During the analog to digital conversion, the entire possible amplitude range of the image signals is divided into a finite number of amplitude stages which are characterized by stage numbers. In the time intervals determined by the timing signal $T_3$, the instantaneous amplitudes of the analog image signals are measured and compared to the established quantized stages and assigned tone values stage numbers. The stage number is coded and after the conversion time, is available at the digital output terminal 25 of the converter 22 as a storage word representing the tone-value of the respective image point for the purpose of adjusting the gradation and for reading into the storage device 28.

On the basis of a resetting command, the output terminal 35 of the recording address counter 31 can lie in the low region. Upon a command from the storage unit 38 to the selection input terminal 85 of the multiplexer 35, the output terminals 35 of the recording address counter 31 can be connected to the address input terminals 37 of the storage unit 33. Through a further command, for a region chain by the storage control unit 38 to the control input terminal 86 of the storage unit 33, the first storage region can be selected. For this condition, the initial address $A_0$ of the first storage region is placed in readiness for recording the data of the first image point.

Recording takes place on a further command from the storage control unit 38 to the control input terminal 87 of the storage unit 33.

The selection of the next address $A_1$ for the storage of the data of the second image point is achieved through the increase of the state of the recording address counter 31 from zero to one by the first cycle of the timing signal $T_3$ which has been delayed in the delay stage 29. The delay time of the delay stage 29 is determined so that the read-in process is terminated prior to the address increase.

The second cycle of the timing signal $T_3$ is connected through the line 48 of the converter 22 and initiates the scanning of the second image point.

After the conversion time, the data of the second image point is read into the address $A_1$ of the first storage region through a "read-in" command from the storage control unit 38 to the control input terminal 87 of the storage unit 33.

The second cycle of the timing signal $T_3$ is delayed by the delay stage 29 and increases the address to address $A_2$ and resets the read-in process of the data for the third image point under that address. On the Zth cycle of the timing signal $T_3$, the last image point of the first image line is stored under the final address $A_z{}^+{}_1$ of the first stored region. The recording address counter 31 is preset at the number $Z_1 = Z_0$ By the input terminal 88 so that after Z cycles, it resets itself and again selects the initial address.

At the same time, the recording address counter 31 through the output terminal 89 of the storage unit 28 gives a command to end the scanning which takes over different control functions.

The flip-flop 80 of the synchronization stage 43 is reset by line 90 which is connected to the input terminal 91 of the synchronization stage 43. The Q output of the flip-flop 80 goes to the low region and the AND gate 44 is inhibited for all additional cycles of the timing signal $T_3$. Thereafter, the recording cycle for the first image line in the first storage region of the storage unit 33 is inhibited. From the command of the end of scanning operation which is connected by line 90 to the phase inverter 46, the phase of the timing signal $T_3$ is substantially simultaneously inverted by 180°.

In addition, the command to line 90 initiates the forward thrusting movement of the scanning member 15 in the motor control stage 19.

The stepping motor 17 is located at the scanning side and carries out as many steps as are needed to move the scanning member 15 in the amount of half the distance between two adjacent image points in the peripheral direction indicated by the direction of the arrow 18.

The number of steps to be executed is predetermined at the input terminal 93 of the motor control stage 19. In addition, through a command "region-change" given by the storage control unit 38 to the control input terminal 86 of the storage unit 33, the second storage region is selected. Then, the second image line can be scanned from the upper margin 70 to the lower margin 71, converted to a digital format, and recorded in the second storage region of the storage unit 33. The read-in process is again initiated through the command for the start scanning operation.

It has been mentioned that in the preferred embodiment the image cylinder 1 must have a slightly larger circumference than the largest engraving cylinder 2. The reason for this is that the system implementation is simpler for this relationship. During the scanning of the first image point of the next image line, the time interval between the command for the end of scanning and the command for the start of scanning must be sufficient so that the forward thrusting movement of the scanning member 15 can be executed. For this reason, the image pattern 12 does not completely encompass the image cylinder 1. In addition, this condition is only fulfilled when the circumference of the image cylinder 1 is greater than the engraving cylinder 2.

The start of the engraving process on the engraving cylinder 2 is determined by the command for the start of the engraving operation which is derived from the command for the start of scanning operation through the time delay in an additional time delay stage 94 of the synchronization stage 43. For this purpose, the output terminal 78 of the delay stage 76 is connected to the input terminal 95 of the delay stage 94. The time delay is constant and is solely for the purpose of taking into account the operating time for the elecctronic components. The output terminal 96 of the delay stage 94 is connected to the setting input terminal of a flip-flop 98. The output terminal 99 of the synchronization stage 43 is connected to the resetting input terminal 100 of the dividing stage 57. The Q output of the flip-flop 98 is connected to the input terminal of the AND gate 59.

The command for the start of engraving operation appears at the output terminal 96 of the delay stage 94 and sets the flip-flop 98 so that its Q output terminal is in the high region and places the AND gate 59 into readiness. From the AND gate 59 and the resetting of the dividing stage 57, the timing signal $T_4$ and the command to start engraving operations are synchronized. The synchronization is necessary because the engraving of the first cavity corresponds to the occurrence of the command to start the engraving operation. The position for the engraving of the cavity is determined by the cycles of the timing signal $T_4$.

With the command for the start of the engraving operation, the first cycle of the timing signal $T_4$ reaches the input terminal 62 of the image line storage unit 28. The reading-address counter 32 is reset and its output terminals 36 are in the low region.

The command is given by the storage control unit 38 to the selection input terminal 85 of the multiplexer 34 so that the output terminals 36 of the reading-address counter 32 are switched to the address input terminals 37 of the storage unit 33. An additional command for "region change" to the control input terminal 86 of the storage unit 33 selects the first storage region again.

Thereafter, the initial address $A_0$ of the first storage region is selected for the first image point of the second image line and this corresponds to the same address that the first image point of the first image line was stored under. The reading out of the data is initiated through a command "read" given by the storage control unit 38 to a control unit 103 of the storage unit 33 when the first cycle of the timing signal $T_4$ appears at the input terminal 62 of the storage unit 28. The data read out is coupled to the digital analog converter 53 and the analog output signal thereof is connected to the engraving amplifier 55 and then to the engraving member 56. When the first cycle of the timing signal $T_4$ energizes the engraving amplifier 55 through the line 63, the first cavity is engraved.

The first cycle of the timing signal $T_4$ which has been delayed in the delay stage 30 selects the address $A_1$ for the storage of the data from the second image point. This data is read out with the second cycle of the timing signal $T_4$.

With the Zth cycle of the timing signal $T_4$, the data of the last image point of the first image line which is stored in the final address $A_{Z+1}$ is read from the first storage region. Then, the read out of the first image line data is terminated and the engraving cylinder 2 would have "$Z_a$" cavities engraved on a continuous engraving line. At the completion of a revolution of the image cylinder 1, a command to start engraving operation is generated and the recording of the next image line can begin. The recording process, however, must be discontinued for a period of time sufficient to allow the forward thrusting step of the engraving member 56 to be executed.

The reading-address counter 32 is preset to a counting capacity of $Z_b$ to a programming input terminal 104 and this counter is set back through the delayed Zth cycle. Thus, the address $A_0$ is selected. A new counting cycle begins without that data from the storage unit 33 being read.

Simultaneously, the reading-address counter 32 generates the command for the end of engraving operation which appears at the output terminal 105 of the storage unit 28. The command for the end of engraving operations fulfills different control tasks.

Through the line 106, this command the end of the engraving operation reaches the phase inverter 61 and results in the reversal of the phase relationship of the timing signal $T_4$ so that the cavities of the second engraving line to be engraved are displaced with respect to the cavities of the first engraving line in accordance with a photogravure screen. Of course, the displaced image points must be scanned in an appropriate manner and this takes place through the phase reversal of the timing signal $T_3$ by the phase inverter 46.

The command for the end of engraving operation also controls the engraving amplifier 55 through the line 106 so that the engraving needle of the engraving member 56 is lifted from the surface of the engraving cylinder 2 in order to inhibit further cavities from being engraved.

At the time of the command for the end of engraving operation, the command for a region change is given by the control unit 38 to the input terminal 86 of the storage unit 33 so that the second storage region is selected for the data of the second image line.

The command for the end of engraving operation starts the stepping motors 66 through the line 106 and the motor control stage 68. The stepping motor 66 carries out as many steps as are needed to displace the engraving member 56 in the amount of half the distance between two cavities in a peripheral direction. The number of steps for the stepping motor 66 to be executed is preset at the input terminal 107. After the engraving member 56 has been advanced, the motor control stage 68 through line 108 and input terminal 109 gives a command for the end of the forward thrust to the storage control unit 38 and to the engraving amplifier 55 for the release of the engraving needle. Then, the recording of the second image line can begin.

As noted, during the forward thrust of the engraving member 56, the reading-address counter 32 continues its counting operation. At the time of the command for the end of the forward thrust, the reading-address counter 32 may have just selected the address $A_a$. Therefore, the read-out of the second image line data does not begin with the gravure of the first cavity but begins with the cavity corresponding to the address $A_a$ at which time the position of the corresponding point on the engraving cylinder 2 is underneath the engraving member 56. The addresses corresponding to the points from "a" to "$Z_b$" are selected and the corresponding cavities are engraved. After this, the addresses corresponding to the points from the first to "a−1" must be selected and the corresponding cavities engraved. This completes the read-out of the data of the second image line. After the gravure of the second image line, the command for the end of engraving is again given at the output terminal 105 of the storage unit 28. The engraving time is considerably reduced with respect to conventional methods because the gravure is continued directly after the conclusion of the forward thrust movement and does not require a completed revolution of the engraving cylinder 2.

Figure 2:
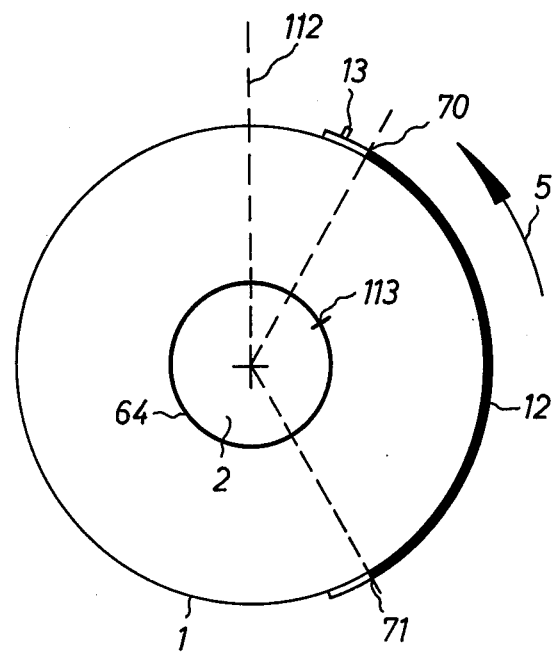
FIG. 2 is a diagrammatic end view of the image and engraving cylinders of FIG. 1.
Figure 3:
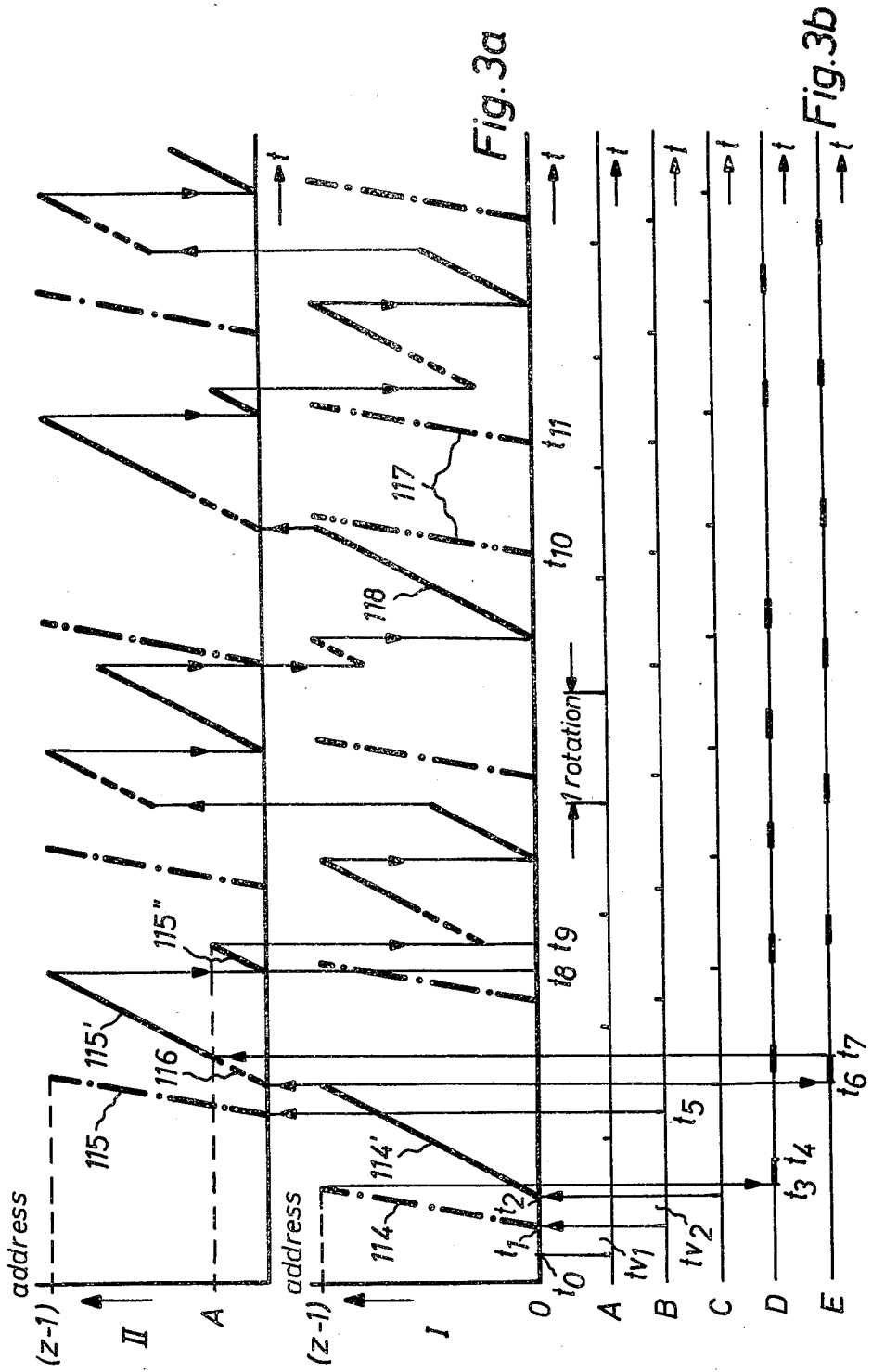
FIGS. 3a and 3b are graphs showing the time relationships during the instant process.

Reference is had to FIGS. 2 and 3 with respect to some of the details for the instant invention.

FIG. 2 shows a diagrammatic side view of the image cylinder 1 and the engraving cylinder 2. In accordance with the preferred embodiment, the cylinders have a diameter ratio of substantially 3:1. The gravure 64 completely surrounds the circumference of the engraving cylinder 2 whereas the image pattern 12 only covers substantially one third of the circumference of the image cylinder 1. The image pattern 12 is accurately aligned on the image cylinder 1 with the aid of the alignment pins 13. The scanning of the first image point begins at the upper margin 70 of the image pattern 12 and is completed with the last image point at the lower margin 71. The dashed line 112 indicates the plan in which the optical axes of the scanning member 15 and the engraving member 56 and the sensor 72 are arranged with respect to the cylinders. The direction of rotation of the cylinders is indicated by arrow 5.

When the alignment pins 13 pass through the line 112, the sensor 72 generates a reference pulse signal from which the time delayed pulse for the command to start scanning operation is derived. The time delay is adjusted so that the command for the start of scanning operation appears substantially exactly at the time when the upper margin passes through the line 112. The scanning operation is finished after exactly "$Z_A$" image points have been scanned, namely at the point in time at which the lower margin 71 of the image pattern 12 is on the line 112.

Through the time delay, the command for the start of the engraving operation is derived from the command for the start of the scanning operation so that, for example, point 113 of the engraving cylinder 2 is on the line 112.

FIGS. 3a and 3b graphically illustrate the timing relationships for the read-in and read-out of data.

In FIG. 3a, the ordinate represents the addresses from $A_0$ to $A_{z+1}$ for the case where "Z" cavities are to be engraved along an engraving line. The abscissa is time.

Section I shows the operation of the first storage region while Section II shows the operation of the second storage region of storage device 33.

FIG. 3b shows the time base coordination for the reference pulse signal (A), of the command to start scanning operation (B), the command to start engraving operation (C), the time for the forward thrust for the scanning member 15 (D), and the time for the forward thrust of the engraving member 56 (E).

The image line storage takes place in the following manner. At the time $t_0$, the reference pulse signal is generated and delayed by the time $t_{v1}$ to the command for start of scanning operation at time $t_1$. At the time $t_1$, the read-in of data for the first scanned image line begins in the first storage region at the initial address $A_0$. The read-in process ends at time $t_3$ with the storage of the last image point of the first image line. The recording read-in process is represented by the straight line 114. At time $t_3$, the forward thrust or advancement of the scanning member 15 takes place and is finished at the time $t_4$. At the time $t_5$, there appears the command for the start of scanning operation after one revolution and the read-in process for the data of the second image line into the second storage region begins as represented by the line 115.

The data of the image lines are alternately recorded into the first and second storage regions. At the time $t_2$, the command for the start of engraving operation appears after it has been delayed with respect to the start of the scanning operation by the time $t_{r2}$. From this, the read-out of the data of the first image line is initiated as represented by the line 114'. The read-out process ends at the time $t_6$ with the reading of the data in the final address.

In correspondence to the ratio of the circumferences of the cylinders, the read-out process $t_6 - t_2$ lasts substantially three times as long as the read-in time of $t_3 - t_1$. This is manifested in the difference in the slopes of the lines 114 and 114'.

At the time $t_6$, a complete engraving line has been engraved and the forward thrust or advancement of the engraving member 56 is initiated and terminated at the time $t_7$.

The selection of the read-out addresses are cyclic and independent of the forward thrust movement of the engraving member 56 so the reading address counter 32 has reached the address $A_a$ at the time $t_7$ as indicated by the dashed line 116.

At the time $t_7$, the read-out of the date for the second image line as represented by the line 115' begins at the address $A_a$. At the time $T_8$, the data under the final address $A_{z+1}$ is read. At this point of time, the data for the addresses corresponding to points zero to $a - 1$ remain to be read-out because these were not read-out during the time $t_7 - t_6$ when the engraving member 56 was being advanced.

The read-out of this data is indicated by the line 115' which begins at the time $t_8$ and ends at the time $t_9$. After that, all of the data for the second image line has been read-out and the engraving for the second engraving line has been completed. Subsequently, the advancement of engraving member 56 can be initiated again.

The engraving of an engraving line requires slightly more than one complete revolution if one takes into account the time for the forward thrusting, in contrast to the scanning operation. As a result of this, the read-out falls behind the read-in of data so that there is an increase in the residue of data which has not been read-out.

At the time $t_{10}$, the read-in process in the first storage region for a further image line begins as represented by the line 117. At this point in time, the read-out process as indicated by the line 118 has not been completed. For this reason, the read-in process is not started at that time and this omission is compensated for after one revolution of the image cylinder 1 at the time $t_{11}$.

Figure 4:
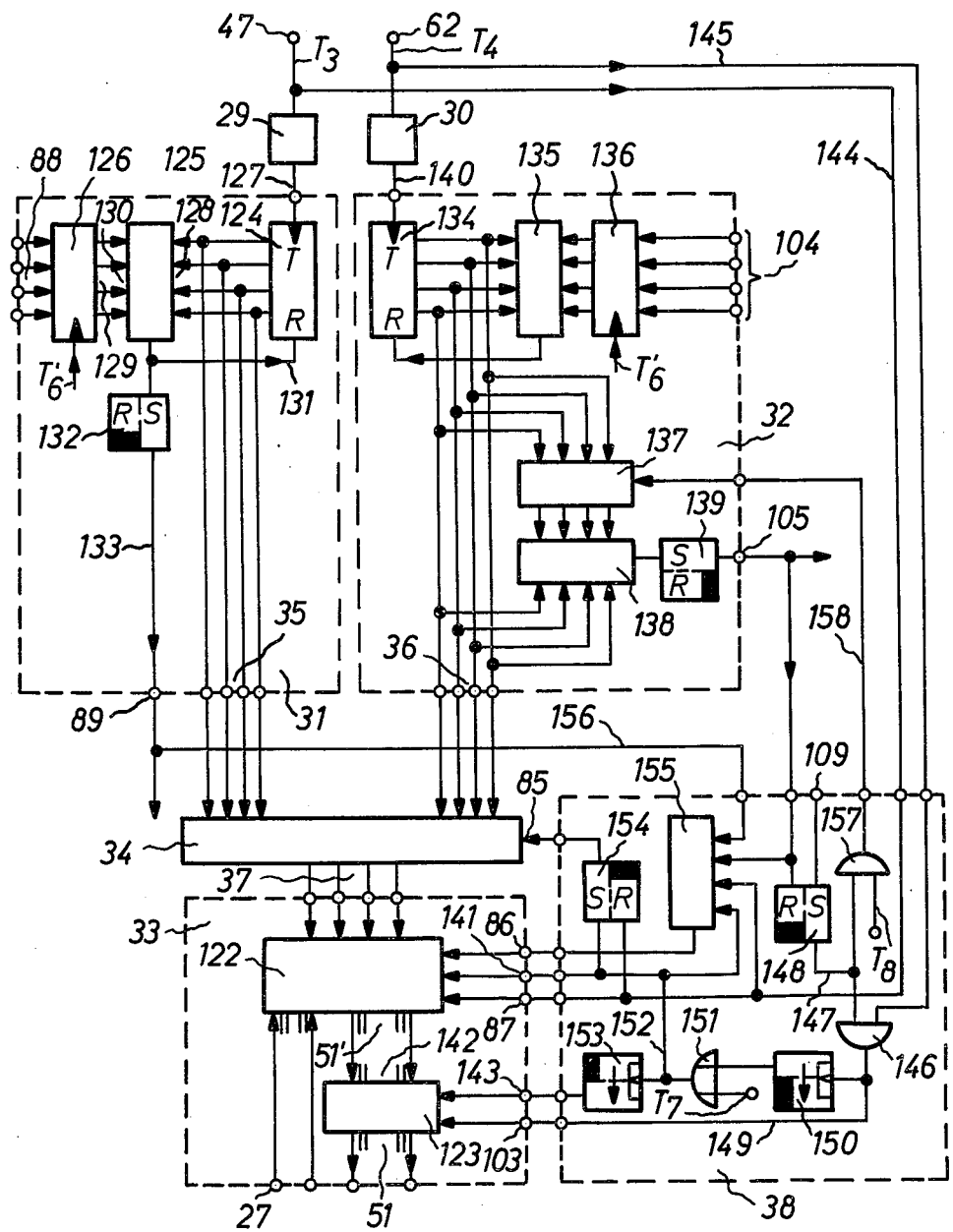
FIG. 4 is a block diagram of a storage device used in the instant invention.

FIG. 4 shows the image line storage unit 28 with some detail. The essential functional blocks are the recording address counter 31, the reading address counter 32, the storage unit 33 with the specific core storage unit 122 and a reading register 123, and the storage control unit 38.

These functional blocks will be described in more detail.

The recording address counter 31 selects the recording addresses. It comprises a binary counter 124 such as an intergated component of the type SN 7493, a comparator 125 such as the type SN 7485, and a register 126 such as the SN 74175. These components and many of the other components mentioned herein are available from Texas Instruments Company and other companies and are known in the art.

The cycle input terminal T of the binary counter 124 is connected to line 127 to the output terminal of the delay stage 29. The delay stage is controlled by the timing signal $T_3$ which is connected to the input terminal 47 of the storage unit 28. The output terminals of the binary counter 124 are also the output terminals 35 of the recording address counter 31 and are connected to the B input terminals 128 of the comparator 125. The output terminals 129 of the register 126 are connected to the A input terminals 130 of the comparator 125. The information input terminals of the register 126 are identical with the programming input terminals 88 of the storage unit 28. Through the input terminals 88, the information $Z_A$ equal to $Z_D$ is taken by the register 126 as binary information A from a cycle of the timing signal $T_6$. In the comparator 125, the information A is compared with the information B which appears at the output terminals 35 of the binary counter 124. If the information are the same, the comparator 125 through the line 131 sends a pulse signal to the resetting input terminal R of the binary counter 124 and to the setting input terminal of the flip-flop 132 which has its Q output terminal connected by line 133 to the output terminal 89 of the storage unit 28. The binary counter 124 in response to the pulse signal from the comparator 125 is set back exactly after Z cycles of the timing signal $T_3$ and the flip-flop 132 is set. At the output terminals 88 of the storage unit 28, the high signal appears which corresponds to the command for end of scanning operation.

The reading address counter 32 selects the read-out addresses. It comprises a binary counter 134, a comparator 135, and a register 136. In addition, there is a register 137, a comparator 138, and a flip-flop 139. The Q output terminal of the flip-flop 139 is identical to the output terminal 105 of the storage unit 28. At this output terminal 105, the command for the end of engraving operation appears. The input terminal of the binary counter 134 is connected to a line 140 with the output terminal of a delay stage 30 in order to couple signal pulses from the timing signal $T_4$ present at the input terminal 62 of the storage unit 28. The information input terminals of the register 136 are identical to the programming input terminals 104 of the storage unit 28 and the output terminals of the binary counter 134 are identical to the output terminals 36 of the reading address counter 32. The quantity $Z_D$ is present at the programming input terminal 104 and is carried over to the register 136 through a cycle of timing signal $T'_6$.

The multiplexer 34 such as TI SN 74157 connects the output terminals 35 of the recording address counter 31 to the address input terminal 37 of the storage unit 33 during the read-in time and connects the output terminal 36 of the reading address counter 32 to the address input terminals 37 of the storage unit 33 during the read-out time. This takes place under the control of the logic state of the selection input terminal 85 of the multiplexer 34.

The storage unit 33 comprises a core storage unit 122 and a reading register 123.

The core storage unit 122 is organized as a system of storages places which can take up a data word at any time and as an alternating storage unit.

Through the address input terminals 37, the addresses of the individual storage places can be selected by choice either from the recording-address counter 31 or from the reading-address counter 32. The timing signal $T_3$ controls the digitalization of the image signals as well as the address selection during the read-in process so that the data is read-in the core storage unit 122 in the sequence determined by the scanning process. The read-in and read-out of the data from the core storage unit 122 is controlled by the control input terminals 87 and 141.

The data input terminals 27 of the storage unit 33 are connected to the gradation stage 26 which is not shown in FIG. 4. The data output terminals 51' are connected to the information input terminals 142 of the reading register 123, the output terminals of which are connected to the output terminal 51 of the storage unit 28. The output terminals 51 are coupled to the converter 53 which is not shown in FIG. 4.

The read-in to the reading register 123 is controlled by the input terminal 143 and the read-out is controlled by the input control input terminal 103.

The necessity of having to subject the data which has been read-out of the core storage unit 122 through an intermediary storage results in the following consideration.

The point of time for the read-in of the data for an image line into the storage unit 28 is determined by the rate of the timing signal $T_3$ and the point of time of the read-out is determined by the rate of the timing signal $T_4$.

The core storage unit 122 does not permit the simultaneous read-in and read-out and the read-in of data has a preference over the read-out, so care has to be taken with regard to the coincidence of the timing signals $T_3$ and $T_4$ in order to avoid an information gap which can disturb the arrangement of cavities being engraved.

An information gap is eliminated through a premature transfer of the data from the core storage unit 122 into the reading register 123. Thus, the data required for the timing signal $T_4$ at time $t_n$ as been transferred into the reading register 123 at the cycle time $t_{n-1}$ so that an eventual coincidence of the timing signals $T_3$ and $T_4$ is available at the cycle time of $t_n$.

A storage control unit 38 generates the commands for the core storage unit 122 and for the reading register 123.

The command to read-in for the storage unit 28 is generated from the timing signal $T_3$. For this purpose, the input terminal 47 of the storage unit 28 is connected to a line 144 to the control input terminal 87 of the core storage unit 122.

The command for the read-out for the storage unit 28 is derived from the timing signal $T_4$. The read-out commands are inhibited during the forward thrusting movement of the engraving member 56.

The input terminal 62 of the storage unit 22 is connected by line 145 to an AND gate 146. The AND gate 146 is controlled through line 147 by the Q output terminal of the flip-flop 148 as a function of the command for the end of engraving operation.

The setting input terminal S of the flip-flop 148 is identical to the input terminal 109 of the storage control unit 38. The command for the end of the forward thrust is coupled through this input terminal 109.

The resetting input terminal R of the flip-flop 148 is coupled to the output terminal 105 of the storage unit 28, at which the command for the end of engraving operation appears.

The output terminal of the AND gate 146 is directly coupled by line 149 to the reading input terminal 103 of the read-out register 123 and through a monostable one shot stage 150, OR gate 151, and line 152. It is connected to the read-in input terminal 141 of the core storage unit 122. The read-in input terminal 141 is connected by the line 152 and another monostable one shot stage 152 to the read-in input terminal 143 of the read-in register 123.

The storage control unit 38 also controls the multiplexer 34 as a function of the read-in and read-out commands. For this purpose, the read-in input terminal 141 of the storage unit 122 is coupled to the setting input terminal S of a flip-flop 154 and the read-in input terminal 87 of the storage unit 122 is connected to the resetting-input terminal R of the flip-flop 154. The Q output terminal of the flip-flop 154 is coupled to the selection input terminal 85 of the multiplexer 34.

The storage regions of the core storage unit 122 are selected through a switch-over stage 155. The selection takes place as a function of the read-in and read-out commands of the command for end of scanning operation and the command for the end of engraving operation.

The output terminal of the switch-over stage 155 is connected to the control input terminal 86 in order to control the change in region.

The mode of operation of the storage control unit 38 is as follows.

The data for the first image point of the first image line is recorded and the Q output terminal of the flip-flop 154 and the selection input terminal 85 of the multiplexer 34 could be in the high region. Through this, the output terminals 35 of the recording-address counter 31 are connected through to the address input terminals 37 of the core storage unit 122. The switch-over stage 155 could have selected the first storage region of the core storage unit 122. Through resetting of the recording-address counter 31, the address $A_0$ of the core storage unit 122 is selected. With the first cycle of the timing signal $T_3$, the read-in command is given through the line 144 to the control input terminal 87 and the first image point data is read into the address $A_0$ of the first storage region.

The recording process of the data for the first image line ends with the command for the end of the scanning operation which is coupled by the line 156 to the switch-over stage 155 so that the other storage region is selected for the second image line. Immediately after the beginning of the recording of the second image line, a read-out command is given through an auxiliary timing signal $T_7$ through the OR gate 151 to the control input terminal 141 of the core storage unit 122 and a recording command which has been delayed through the monostable one shot 153 is given to the recording input terminal 147 of the read-out register 123. The flip-flop 154 is also controlled by this and the selection input terminal 85 changes to the low region as a result of which the output terminals 36 of the reading-address counter 32 are connected to the address input terminals 37. The address $A_0$ is selected for a short time period because the reading-address counter 32 is also reset and the data is transferred into the reading register 123.

With the first cycle of the timing signal $T_4$, a read-out command is given to the input terminal 103 of the read-out register 123 through the line 144 and through the AND gate 146 and the data of the first image point is read. The first cycle of the timing signal $T_4$ arrives through the delay stage 150 and the OR gate 151 to the resetting input terminal R of the flip-flop 154 at the switch-over stage 155 as the read-out command for the input terminal 143 of the read-in register 123.

At this point in time, the data of the second image point which has been stored under the address $A_1$ is transferred from the core storage unit 122 to the read-in register 123 and can be read-out of the read-out register 123 with the second read-out command. When the last image point of the first image line is read-out, the command for the end of the engraving operation appears at the output terminal 105 of the reading-address counter 32. The flip-flop 148 is reset and the AND gate 146 is coupled to the timing signal $T_4$. Then, the read-out process is interrupted, but the reading-address counter 32 continues with its counting operations.

With the command for the end of engraving operation, the forward thrust of the engraving member 56 is initiated until it generates the command for the end of the forward thrust through the input terminal 109 of the storage control unit 38. The command for the end of forward thrust energizes a flip-flop 148 so the timing signal $T_4$ can pass through the AND gate 146 and the read-out process is continued. At the same time, an auxiliary timing signal $T_8$ arrives at the input terminal of the register 137 of the reading-address counter 32 through the AND gate 157 and the line 158.

The address which has been selected at the point of time of the command for the end of forward thrust is taken over into the register 137 and this could be the address $A_a$.

The data from the address $A_a$ to the end is read-out and subsequently the data from the addresses $A_0$ to $A_{a+1}$ which were not previously read are now read. For this purpose, the comparator 138 compares the selected addresses with the address $A_a$ stored in the register 132. When the reading address counter 32 has again selected the address $A_a$, the comparator 138 generates a pulse signal which sets the flipflop 139 and thereby generates the command for the end of engraving operation.

Figure 5:
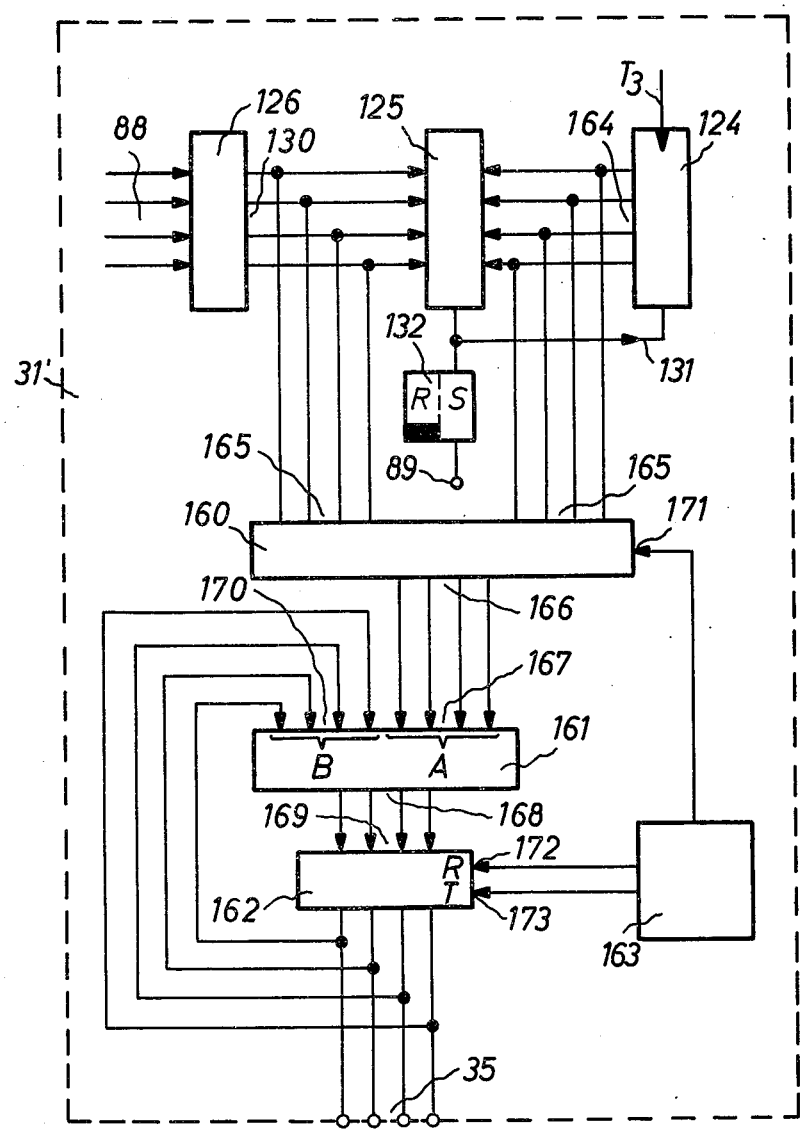
FIG. 5 is a block diagram of a recording-address counter for use in the repeating process in the peripheral direction.

FIG. 5 shows a preferred embodiment for a recording address counter for the execution of the instant invention with regard to the repeating process in a peripheral direction. In this procedure, all the data to be recorded for an entire peripheral line is put into the storage unit prior to the record. In comparison, the repeating process requires considerably less expenditure for the storage control.

During the repeating process in a peripheral direction, several identical repeats of an image pattern are to be engraved on the circumference of the engraving cylinder 2. The number of repeats is "N". The rate of rotation of the engraving cylinder 2 is adjusted so that the number $Z_D$ of cavities to be engrave along a peripheral line is integrally divisible by the number "N". Through this, the same number of cavities, namely $Z_D/N$, is apportioned to each repeat so that the system error is eliminated and a reproduction with accurate matching is made possible.

Over the length of a peripheral line, there are $Z_D/N = Z_A$ image points to be scanned. The data for engraving a line is stored through the multi-fold storage under appropriate addresses in accordance with the instant invention. A basic address is formed from these addresses through the repeated addition of the "$Z_a$" of image points scanned per scanning line.

Thus, the term "basic addresses" describes the data required for engraving the first repeat from the initial address to the final address.

For example, in the case of three repeats, the first image point is simultaneously read-in under the addresses $A_0$, $A_Z$, $A_{2Z}$ and the second image point is read under the addresses $A_1$, $A_{Z+1}$, and $A_{2Z+1}$ and the last scanned image point is read into the addresses $A_{Z-1}$, $A_{2Z-1}$, and $A_{3Z-1}$.

The selection of the addresses is made with the aid of a recording-address counter 31' which includes elements such as the register 126, the comparator 125, the flip-flop 132, and the binary counter 124 and further includes a multiplexer 160 of the TI type SN 74157, and adder 161 such as TI - SN 7483, an additional register 162 such TI SN 94175, and a control circuit 163. In the case of the peripheral repeating process the recording-address counter 31' is preset to the number $Z_A = Z_{D/N}$ by the programming input terminal 88. This number is taken over into the register 126.

The binary counter 124 is controlled by the timing signal $T_3$. The output information of the binary counter 124 and the information stored in the register 126 are compared in the comparator 125. In the case of a similarity of the information, the binary counter 124 is reset by the line 131 and the flip-flop 132 is set. The Q output terminal of the flip-flop 132 goes into the high region and this generates the end of scanning operation command. The output terminal 164 of the binary counter 124 and the output terminals of the register 126 are connected to the input terminals 154 of the multiplexer 160. The output terminals 166 of the multiplexer 160 are coupled to the A input terminals 167 of the adder 161. The summation output terminals 168 are connected to the information input terminals 169 of the register 162. The output terminals 35 of the register 162 are identical with the address output terminals of the recording-address counter 31' and are coupled back to the B input terminals 170 of the adder 161. In addition, the control circuit 163 is connected by separate circuits to the selection input terminal 171 of the multiplexer 160, the resetting input terminal 172 of the register 162, and with the input terminal 173.

Assume that the binary counter 124 and the register 162 are reset and that the multiplexer 160 is adjusted so that the output terminals 164 of the binary counter 124 are connected through the A input terminals 167 of the adder 161. Then, the output terminal 164 of the binary counter 124, the output terminals 35 of the recording-address counter 31' for the selection of the address $A_0$, and also the B input terminals 170 of the adder 161 lie at zero. A control pulse signal to the selection input terminal 171 of the multiplexer 160 causes the output terminals of the register 126 at which the information $Z_A = Z_D/N$ is present are switched to the A input terminals 167 of the adder 161. This information $Z_A$ is taken over into the register 162 with the control pulse signal at the input terminal 173 of the register 162. It appears simultaneously at the output terminals 35 of the recording-address counter 31' for the selection of the address Z and at the B input terminals 170 of the adder 161. At the A input terminals 167 as well as the Z input terminals 170 of the adder 161, the information $Z_A$ is present so that the summation output terminal 168 shows the information $2Z_A$ and for a new control pulse signal the information $2Z_A$ can be taken over to the input terminal 173 of the register 162 and passed on to the output terminals 35. Thus, in the case of the example with three recordings of the image pattern at the circumference of the engraving cylinder 2, the addresses $A_0$, $A_Z$, and $A_{2Z}$ are read-in and the data of the first image point is stored. The selection of these two addresses must be completed prior to the arrival of the first cycle of the timing signal $T_3$ at the input terminal of the binary counter 124 because the next basic address with a second image point is selected by the first cycle of the timing signal $T_3$.

Figure 6:
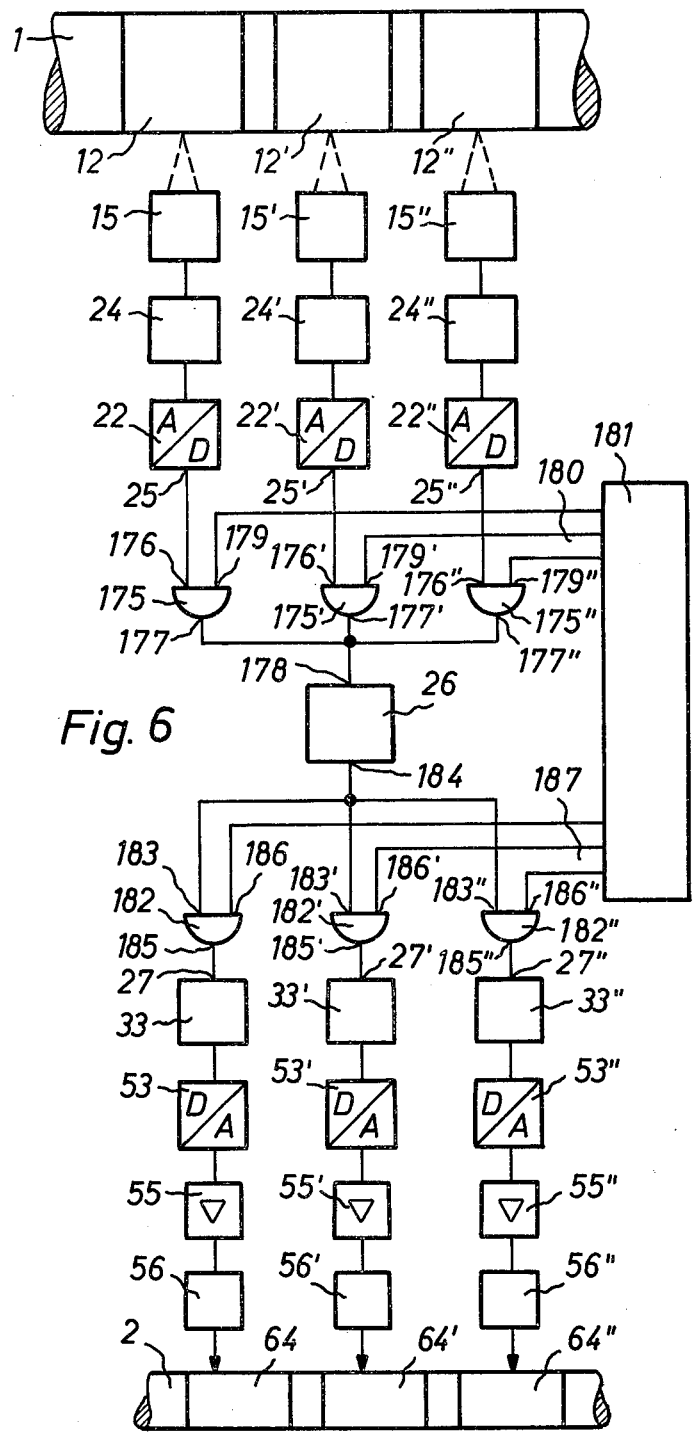
FIG. 6 is a block diagram for a system for the simultaneous engraving of several image patterns according to the instant invention.

FIG. 6 shows a block diagram of an engraving setup for use in connection with the simultaneous recording of several image patterns on an engraving cylinder. Three image patterns 12, 12', and 12" are mounted in a stretched out manner on the image cylinder 1. Scanning members 15, 15', and 15", scanning amplifiers 24, 24' and 24", analog the digital converters 22, 22', and 22", storage units 33, 33', and 33", digital analog converters 53, 53', and 53", engraving amplifiers 55, 55', and 55", and engraving members 56, 56', and 56" are employed. The engraving members 56, 56' and 56", engrave at surface portion 64, 64', and 64" of the engraving cylinder 2.

The change of the tone value for the recording with respect to the tone value of the character in the respective image pattern, only a single gradation stage 26 is provided for all of the image signals. The data at the output terminals 25, 25', and 25" of the respective converters 22, 22', and 22" are coupled to the multiplexer process in the corresponding storage units 33, 33', and 33" through the gradation stage 26. For this purpose, AND gates 175, 175', and 175" are assigned to the converters 22, 22', and 22", respectively for the input terminals 176, 176', and 176" of the AND gates from the output terminals 25, 25', and 25". The AND gates 175, 175', and 175", are also connected to the input terminal 178 of the gradation stage 26. The control input terminals 179, 179' and 179" of the AND gates 175, 175', and 175", are connected by the lines 180 to the pulse generator 181.

Through the line 180, the pulse generator 181 supplies a first pulse signal to control the AND gates in a sequence determined by the first pulse signal sequences so that the output terminals 25, 25' and 25" of the converters 22, 22', and 22" are chronologically switched to the input terminal 178 of the gradation stage 26.

Similarly, additional AND gates 182, 182', and 182" are assigned to the storage units 33, 33', and 33" so that the input terminals 183, 183', and 183" of the AND gates 182, 182', and 182" are also connected with the output terminal 184 of the gradation stage 26 so that the output terminals 185, 185', and 185" of the AND gates 182, 182', and 182", are connected in each case respectively to the data input terminals 27, 27', and 27" of the respective storage units 33, 33', and 33". The control input terminals 186, 186', and 186" of the AND gates 182, 182', and 182" are connected by the lines 187 to the pulse generator 181. The pulse generator 181 through the line 187 supplies a second pulse signal which controls the AND gates 182, 182', and 182", so that the output terminal 184 of the gradation stage 26 is connected to the data input terminals 27, 27', and 27" of the storage units 33, 33', and 33", in the sequence determined by the first pulse signal and at approximately the same time as the latter.

Of course, the gradation stage 26 can be arranged, to all the image signals beyond the storage units 33, 33', and 33".

By the use of a single gradation stage, there is a considerable savings of cost and the engraving process is shortened because only a single gradation stage would require adjustment.

We wish it to be understood that we do not desire to be limited to the exact details of construction shown and described, for obvious modifications will occur to a person skilled in the art.

Having thus described the invention, what we claim as new and desire to be secured by Letters patent is as follows:

1. A method for the production of a printing form by the scanning point-by-point and line-by-line of an image pattern along successive cylindrical peripheral image lines and engraving cavities along corresponding cylindrical peripheral engraving lines, the steps comprising:
generating image signals from said image pattern from along one of said cylindrical peripheral image lines;
reading said image signals into a storage device;
reading said stored signals out of said storage device and coupling said read-out image signals to an engraving device;
engraving with said engraving device along a cylindrical peripheral engraving line corresponding to said one image line in response to said read-out image signals;
moving said engraving device to a succeeding cylindrical peripheral engraving line;
inhibiting the engraving and the read-out of said image signals at least during the time said engraving device is being moved to the succeeding engraving line, continuing the read-out and engraving of said succeeding engraving line at the stored image signals or cavities marking the end of the moving of said engraving device
and in that, when the end of the engraving line is reached, the first portion of it, which was previously omitted, is engraved retrospectively and the next movement of the engraving device to the succeeding engraving line takes place.

2. The method as claimed in claim 1 wherein said image pattern is disposed on an image cylinder, further comprising rotating said image cylinder to generate said image signals and generating a scanning timing signal in the form of a train of pulse signals, wherein the integral number of pulse signals generated during the time for scanning a peripheral image line of said image pattern in one complete revolution of said image cylinder is substantially equal to the number of cavities to be engraved along the cylinderical peripheral engraving line.

3. The method as claimed in claim 1, wherein said image pattern is disposed on an image cylinder and the engraving is to be carried out on a part of the surface of an engraving cylinder, further comprising rotating said image cylinder to generate said image signals and generating a scanning timing signal in the form of a train of pulse signals, wherein the integral number of pulse signals generated during the time for scanning a peripheral image line of said image pattern in one complete revolution of said image cylinder is substantially smaller by the same amount as an engraved line is smaller than an entire peripheral engraving line.

4. The method as claimed in claim 1, further comprising generating a scanning timing signal for digitizing the image signals in correspondence to the scanned image points on each image line and for reading-in the digital image signals into the storage device line-by-line from a first address associated with the first image point on an image line to a last address associated with the last image point in this image line, said image signals being generated by a scanning member, generating a pulse signal when the last address of said addresses is read in and coupling said pulse signal to a moving means operable for moving said scanning member to the successive image line.

5. The method as claimed in claim 1, further comprising generating a recording timing signal for reading out the stored digital image signals from said storage device and for controlling the engraving of the cavities along the peripheral engraving lines, the recording timing signal being in the form of a train of pulse signals, each pulse signal corresponding to a cavity to be engraved, the number of pulse signals in a complete revolution of the engraving cylinder being integral.

6. The method as claimed in claim 1, further comprising generating a recording timing signal for reading out the stored digital image signals from said storage device, wherein to read-out the digital image signals for the first engraving line the associated addresses are called up from the first address to the last address under the timing of said recording timing signal, the engraving device moves to the succeeding engraving line, when the last address of the first engraving line is reached, the addresses for the digital image signals of the succeeding engraving line continuing to be selected and that address which just been called up at the end of the movement of said engraving device being marked so that when the last address for said engraving line is reached, the addresses for the beginning of said engraving line are selected from the first address to the address marked and the engraving device is caused to move to the succeeding engraving line.

7. The method as claimed in claim 1, further comprising generating a scanning timing signal for digitizing the image signals and for reading-in the digital image signals into the storage device, generating a first command pulse signal, delaying said command signal a predetermined time period, applying said delayed first command signal to start said scanning timing signal and to initiate digitizing said image signals and said read-in of said digital image signals into said storage device, generating a second command pulse signal for interrupting said scanning timing signal to stop the digitizing and read-in process and initiating the movement of a scanning member, generating a third command pulse signal from the time delayed first command pulse signal to initiate the read-out of said digital image signals and to initiate the engraving process, generating a fourth command pulse signal by a marked address for initiating the movement of said engraving device and interrupting the read-out and engraving process during the movement of said engraving device, and generating a fifth command pulse signal for marking said address and continuing the read-out and engraving process when the movement of said engraving device is completed.

8. A method according to claim 6, wherein the address to be marked is transferred by said fifth command pulse signal to a register, the address stored in said register is continuously compared in a comparator with the addresses which continue to be called up, and in which the comparator generates said fourth command pulse signal when the addresses are the same.

9. The method as claimed in claim 1, wherein a plurality of repeats of the image pattern are produced around the circumference of the printing cylinder, further comprising generating a recording timing signal in the form of train of pulse signals, each pulse signal corresponding to a cavity to be engraved, said recording timing signal being so selected that the number of pulse signals which occur during one revolution of the printing cylinder is integrally divisible by the number of repeats to be engraved, generating a scanning timing signal in the form of a train of pulse signals, each pulse signal corresponding to an image point of said image pattern, the number of pulse signals which occur during the scanning of one image line of said image pattern is equal to the number of pulse signals of said recovering timing signal divided by the number of repeats.

10. The method as claimed in claim 9, wherein said digital image signals are stored in said storage device with displacements as many times as there are repeats engraved around one peripheral engraving line and under addresses corresponding to the positions of the repeats along said engraving line.

11. The method as claimed in claim 1, further comprising assigning to each image signal a tone value from a predetermined range of tone values of a correcting storage.

12. The method as claimed in claim 11, wherein there are a plurality of image pattern and image signals are generated for each set of image patterns for respective engraving devices and said image signals are sequentially assigned tone values by a multiplexing process.

13. The method as claimed in claim 1, wherein said image pattern is disposed on an image cylinder and said engraving is carried out the surface of an engraving cylinder, further comprising interconnecting cylinders so that the rotation of one has a corresponding rotation for the other, generating a scanning timing signal, and generating a recording timing signal, the ratio of the frequency of said scanning timing signal to the frequency of said recording timing signal being substantially equal to the ratio of the diameter of said image cylinder to the diameter of said engraving cylinder.

14. The method as claimed in claim 1, wherein said storage device comprises two memory devices and the digital image signals for the successive image lines are read-in to the memory devices alternately.

15. The method as claimed in claim 1, wherein said image pattern is mounted on an image cylinder and said engraving is done on the surface of an engraving cylinder, said image cylinder being selected to have a larger diameter and the diameter of said engraving cylinder.

16. An apparatus for the production of a printing form by the scanning point-by-point and line-by-line of an image pattern along successive cylindrical peripheral image lines and engraving cavities along corresponding cylindrical peripheral engraving lines, comprising, in combination:
scanning means operable for generating image signals from said image pattern from along one of said cylindrical peripheral image lines;
a storage device coupled to said scanning means and operable for storing said image signals which are read into it;
read-out means coupled to said storage device and operable for reading-out said stored image signals;
an engraving device;
coupling means operable to couple said read-out image signals to said engraving device;
moving means operable to move said engraving device to a succeeding cylindrical peripheral engraving line; and inhibiting means operable to said engraving device, said moving means and said read-out means to inhibit the engraving and the read-out of said image signals at least during the time said engraving device is being moved to the succeeding engraving line and to continue the read-out and engraving of said engraving line at the stored image signals or cavities marking the end of the movement of said engraving device, arranged to complete engraving of the first portion of the engraving line, which was previously omitted, and to start the next movement of said engraving device to the succeeding engraving line.

17. An apparatus for the production of a printing form by the scanning point-by-point and line-by-line of an image pattern along successive cylindrical peripheral image lines and engraving cavities along corresponding cylindrical peripheral engraving lines, comprising, in combination:
a rotatable image cylinder for receiving said image pattern, a rotatable engraving cylinder, scanning means operable for scanning said image pattern and for producing image signals corresponding to image points in said image pattern;
an engraving means operable for engraving said engraving cylinder;
an analog to digital converter coupled to said scanning means and operable for converting said image signals to digital image signals;
a storage device coupled to said analog to digital converter and operable for storing said digital image signals;
a digital to analog converter coupled to said storage device and operable connected to said engraving means,
sensor means operable for producing a first command pulse signal when a predetermined part of said image cylinder rotates past a predetermined spatial position;
an adjustable first delay stage couples to said sensor means and operable for delaying said first command pulse signal,
read-in means coupled to said storage device and operable for producing a second command pulse signal when the last address of said image line has been reached and operable for controlling the read-in process,
a first generator operable for generating a scanning timing signal for controlling said scanning means, said analog to digital converter and the read-in process into the storage device,
first coupling means operable to couple said first command pulse signal to said first generator to start the scanning timing signal therein;
second coupling means operable to couple said second command pulse signal to said first generator to interrupt the scanning timing signal therein;
first moving means responsive to said second command pulse signal and operable for changing the position of said scanning member to a succeeding image line;
a second delay stage coupled to said first delay stage operable to generate a third command pulse signal,
read-out means coupled to said storage device operable for controlling the read-out process,
a second generator for generating a recording timing signal operable connected with said read-out means and said engraving means for controlling the engraving and the readout process;
third coupling means operable to couple said third command pulse signal to said second generator to start the engraving process;
second moving means operable for moving said engraving member to a succeeding engraving line and for generating a fifth command pulse signal when the movement is finished;
inhibit means operable connected with said readout means and said engraving means to inhibit engraving and read-out at least during the time period that the engraving member is being moved, said inhibit means generating a fourth command pulse signal when the engraving of one engraving line is complete;
fourth coupling means operable to couple said fifth command pulse signal to said inhibit means for continuing engraving when the movement of said engraving member is finished;
and fifth coupling means operable to couple said fourth command pulse signal to said second moving means for starting movement when the engraving of one engraving line is complete.

18. The apparatus as claimed in claim 16, wherein in the diameter of said image cylinder is greater than the diameter of said engraving cylinder.

19. The apparatus as claimed in claim 17, wherein the frequency of said scanning timing signal to the frequency of said recording timing signal being substantially equal to the ratio of the diameters of said image cylinder and said engraving cylinder.

* * * * *